US006537635B1

(12) United States Patent
Bakos et al.

(10) Patent No.: US 6,537,635 B1
(45) Date of Patent: Mar. 25, 2003

(54) PSEUDO-REFLECTIVE READ INHIBITOR FOR OPTICAL STORAGE MEDIA

(75) Inventors: Yannis Bakos, New York, NY (US); Erik Brynjolfsson, Cambridge, MA (US); Adam Heller, Alameda, CA (US); Ephraim Heller, Alameda, CA (US)

(73) Assignee: Flexplay Technologies, Inc., New York, NY (US)

( * ) Notice: Subject to any disclaimer, the term of this patent is extended or adjusted under 35 U.S.C. 154(b) by 0 days.

(21) Appl. No.: 09/507,224

(22) Filed: Feb. 18, 2000

Related U.S. Application Data
(60) Provisional application No. 60/125,927, filed on Mar. 23, 1999, and provisional application No. 60/128,197, filed on Apr. 7, 1999.

(51) Int. Cl.[7] ................................................. B32B 3/02
(52) U.S. Cl. ................. 428/64.1; 428/64.4; 430/270.12
(58) Field of Search .............................. 428/64.1, 64.2, 428/64.4, 457, 913; 430/270.12, 495.1, 945

(56) References Cited

U.S. PATENT DOCUMENTS

| 5,815,484 A | 9/1998 | Smith et al. |
| 6,011,772 A | 1/2000 | Rollhaus et al. |
| 6,228,440 B1 * | 5/2001 | Dailey ........................ 428/1.1 |

* cited by examiner

Primary Examiner—Elizabeth Mulvaney
(74) Attorney, Agent, or Firm—Hale and Dorr, LLP.; M. Scott Carey

(57) ABSTRACT

Systems and methods are described for inhibiting the readability of an optical media due to changes in a pseudo-reflective material that composes the optical media after the optical media has been exposed to air for a predetermined time. An optical media includes a data encoded component. At least a fraction of the data encoded component transforms from a substantially optically reflective state to a substantially optically non-reflective state as at-least-in-part a function of time from an initializing event. The systems and methods provide advantages because of low cost, limited content lifetime, avoidance of rental returns and minimum changes to existing manufacturing precesses.

46 Claims, 2 Drawing Sheets

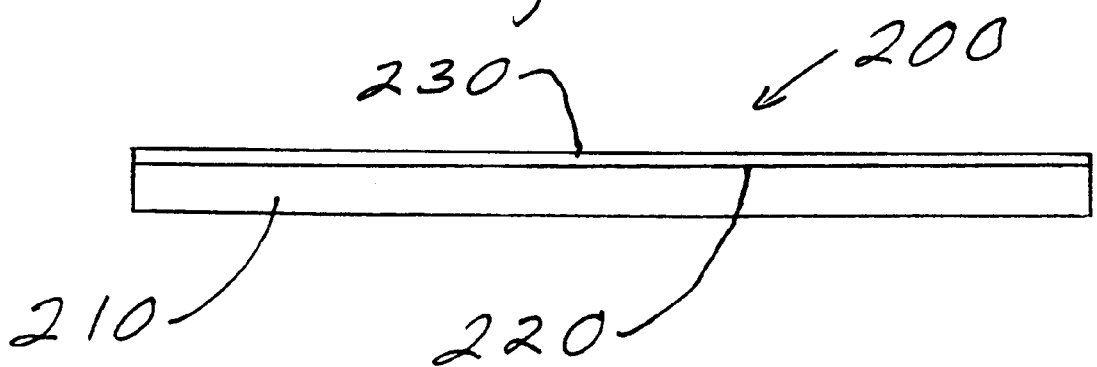
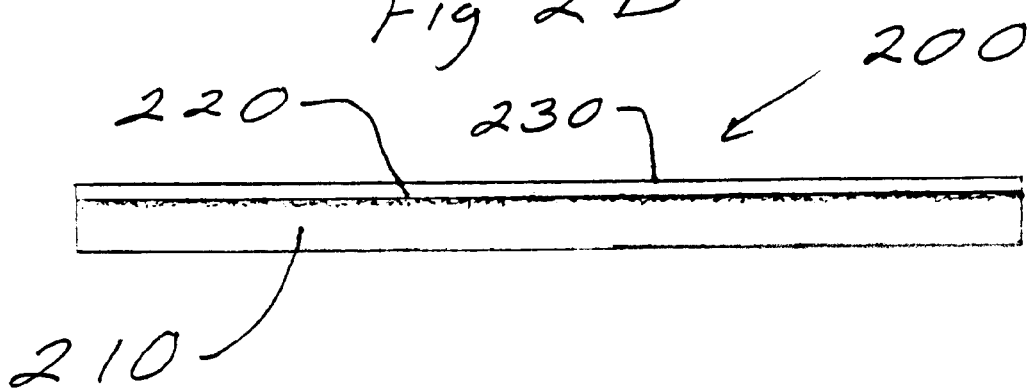

PSEUDO-REFLECTIVE READ INHIBITOR FOR OPTICAL STORAGE MEDIA

CROSS-REFERENCES TO RELATED APPLICATIONS

This application is a continuation-in-part under 35 U.S.C. §120 of both copending U.S. Ser. No. 60/125,927, filed Mar. 23, 1999, now pending; and copending U.S. Ser. No. 60/128, 197, filed Apr. 7, 1999, now pending, the entire contents of both of which are hereby incorporated herein by reference as if fully set forth herein.

BACKGROUND OF THE INVENTION

1. Field of the Invention

The invention relates generally to the field of optical media. More particularly, the invention relates to time sensitive disposable optical media.

2. Discussion of the Related Art

Optical disks such as CDs and DVDs are sold and rented to consumers for use at home. The content of the optical disks may be music, movies, software or data. Unfortunately, the purchase of CDs and DVDs can be expensive. The cost is associated not primarily with the manufacturing cost of the optical disks, but with the value of the information, such as movies or software, encoded on the disks. Content providers, such as movie studios or software companies, do not want to sell at a low cost copies of their material that will have a long lifetime in the marketplace. Rentals of CDs and DVDs enable consumers to access the information at a lower cost, but the need to return the rentals on time is inconvenient. It would be desirable to have an optical media (e.g., disk) that the user could purchase at a low cost, would address the concerns of the content providers about lifetime of their content in the marketplace, and which would not have the disadvantage of having to be returned, as is the case with videotape movie rentals today. It would also be desirable to manufacture such an optical disk at low cost and with minimum changes to existing optical disk manufacturing processes.

Heretofore, the requirements of low cost, limited content lifetime, avoidance of rental returns and minimum changes to existing manufacturing precesses referred to above have not been fully met. What is needed is a solution that simultaneously addresses all of these requirements. The invention is directed to meeting these requirements, among others.

SUMMARY OF THE INVENTION

A goal of the invention is to simultaneously satisfy the above-discussed requirements of low cost, limited content lifetime, avoidance of rental returns and minimum changes to existing manufacturing precesses which, in the case of the prior art, are not simultaneously satisfied.

One embodiment of the invention is based on an optical disk, comprising: a substrate; a metal layer coupled to said substrate; and a lacquer coupled to said metal layer, wherein optical properties of said substrate change upon an exposure of said substrate to air, said exposure degrading readability of data recorded on said optical disk. Another embodiment of the invention is based on a package containing an optical disk, said optical disk comprising: a substrate, a metal layer coupled to said substrate; and a lacquer coupled to said metal layer, wherein opening said package triggers a process that changes optical properties of said substrate, thereby degrading an ability to read data recorded on said optical disk.

Another embodiment of the invention is based on an optical disk, comprising: a substrate; a metal layer coupled to said substrate; and a lacquer coupled to said metal layer, wherein at least one member selected from the group consisting of said substrate and said lacquer permit controlled exposure of said metal layer to air, thereby degrading readability of data recorded on said optical disk. Another embodiment of the invention is based on a package containing an optical disk, said optical disk comprising: a substrate, a metal layer coupled to said substrate; and a lacquer coupled to said metal layer, wherein opening said package triggers a process that changes reflective properties of said metal layer, thereby degrading an ability to read data recorded on said optical disk.

These, and other, goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters (if they occur in more than one view) designate the same parts. It should be noted that the features illustrated in the drawings are not necessarily drawn to scale.

FIGS. 2a–2b illustrate schematic side views of another optical disk, representing another embodiment of the invention.

DESCRIPTION OF PREFERRED EMBODIMENTS

Figure 1A:
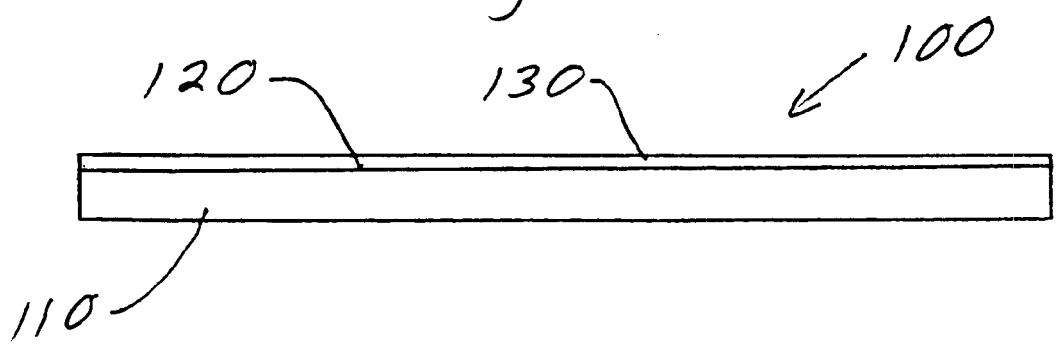
FIGS. 1a–1b illustrate schematic side views of an optical disk, representing an embodiment of the invention.

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

The context of the invention includes reading data from an optical media. Optical disks represent a generic class of optical media. The sub-generic class of DVD-ROM can contain any digital information. DVD-Video is based on DVD-ROM standard and also on the standards represented by MPEG-2 and Dolby Digital. The invention can utilize data processing methods that transform signals produced from the data encoded on the optical media so as to actuate interconnected discrete hardware elements; for example, to start, stop and/or actuate other functions of the media reader (device) that is accessing the data on the optical media.

The concept of the invention includes disposable optical media, such as, for example time-sensitive disposable digital video disk (DDVD). A DVD could be manufactured or packaged in such a way that it can only be used for a limited time period or a limited number of uses.

The DVD could react with oxygen in the air so that once it was removed from an air-tight package, the surface would obscure a fraction of the underlying data. For instance, some plastics may be come cloudy, or black.

The DVD could react with other constituents of air such as moisture or other gases so that once it was removed from an air-tight package, the surface would obscure a fraction of the underlying data. Again, some plastics may be come cloudy, or black.

The DVD could react to light, such as the laser light that is used to read data, so that it could not be read again after some number of readings. This could be a photochemical process similar to photography or the clouding of a substance when exposed to light.

The DVD could react to ambient room light so that it could not be read again after some number of readings. Again, this could be a photochemical process similar to photography or the clouding of a substance when exposed to light.

An electrostatic or mechanical reaction could occur when the DVD is removed from the packaging which sets in motion a timed destruction of the data. The effect could be powered by a small battery or simply the energy released when the DVD is removed from the package.

The process of removing the DVD from the packaging or playing it in a device could set off the timing in any other way. For example, removing the DVD from the packaging might break a seal exposing either the data side or the label side of a single-sided DVD to reactants contained within either the DVD or the packaging materials, thus triggering the process that renders the DVD unusable after a certain period of time or a certain number of uses.

The DVD player could actively read some encrypted identifying information from the DVD and refuse to play it again. This could be implemented either by actively modifying the DVD or by storing this information in the player or in a network.

The degradation can be relatively sudden (S-shaped), if possible, so that there would be minimal affect on the data for some initial period, and then a rapid loss of data. For instance, by including in the DVD a finite, controlled quantity of antioxidant along with a substance that reacts to oxygen, it could be possible to initially protect the data, and then when the anti-oxidant was used up, rapidly have the DVD degrade.

The invention can readily apply to related media such as compact discs (CDs), Laser disks, CD-ROMs, tapes, etcetera. Applications of the invention include storage of limited-viewing movies, which could supplant the video rental market. Other applications of the invention include "trial" disks with music, software or other digital information, mail order catalogs for music, videos, software, data, games, etcetera; hybrid disks with some permanent components (e.g., coming attractions), games with limited time for completion, etcetera.

The time during which the data would be useable could range from less than a few seconds to more than several weeks. The time during which the data would be useable could be limited to a single playing, some finite number of uses, or even a random number of uses.

An extra layer on the disk is not required to achieve the desired results. In one embodiment, exposure to the ambient environment will damage the performance of the metal layer.

The term "substrate" is defined herein to be the one or more layers through which the laser light passes before impinging on the metal layer. The substrate can be polycarbonate, but other materials known to those skilled in the art may be used.

The term lacquer is defined herein to be the layer or layers on the back of the disk. One or more of these layers may be composed of a material identical, or similar, to the one used for the substrate. The laser light is not intended to pass through the lacquer. Typically a one-sided disk (such as a CD or a DVD-5) will have a reflective metal layer between the substrate and the lacquer. In a two-sided disk (such as a DVD-10), the lacquer will typically include a layer binding together the two sides of the disk.

In one embodiment, the invention includes an optical disk on which the metallic layer containing the data is not completely protected from the ambient environment. For example, a portion of the surface may deliberately not be coated by the lacquer or substrate. This permits the unprotected portion of the metallic layer to be acted upon by the ambient environment. The reflective metal may react with a component of air. For example, an aluminum layer may be oxidized by the oxygen in air to aluminum oxide. After a period of exposure to the ambient environment the quality of the signal reflected by the metallic layer will degrade, resulting in poor data quality or even the inability to read the data on the disk.

The rate of degradation can be defined by the metal. It is accelerated when the metal is magnesium or silver and is decelerated when the metal is aluminum. If the metal is in electrical contact with a second metal, the degradation is accelerated. For example, contacting of aluminum with silver, gold or copper accelerates the degradation. In general, contacting of magnesium or aluminum with a more noble metal accelerates the degradation of the magnesium or the aluminum layer. When two metals are used, the rate of degradation can be adjusted through the ratio of their exposed areas. When the two different metals are overlapping films, the rate of degradation is also determined by the overlap.

It is not necessary that the entire surface be unprotected. For example, it is sufficient to leave unprotected only key portions of the optical disk that contain data necessary to read the remainder of the disk.

It is possible to control the time required for the metallic layer of the optical disk to degrade by controlling the thickness, quality or composition of the substrate or lacquer. For example, a substrate or lacquer may be chosen such that the flux of oxygen, nitrogen, water or hydrogen sulfide reaching the metallic surface is a function of the thickness of the layer. Alternatively, the materials comprising the substrate or lacquer may be chosen such that layers of equal thickness have different permeabilities to oxygen, water or hydrogen sulfide. In such a way optical disks can be designed to fail at a desired time after exposing them to the destructive environment, e.g., one hour, six hours, 24 hours, 48 hours, 72 hours or one week.

Alternative Embodiment

Another composition that performs a similar function is one in which the substrate itself is modified over time. The modification of the substrate could cause it to change its optical qualities, thereby degrading the signal reaching the reader. These optical qualities could include its index of refraction or its transparency.

Moreover, the modification of the substrate could cause the underlying metal layer to change its optical properties, as described above. In this way, a time-sensitive substrate and/or lacquer could be combined with a reflective layer that becomes non-reflective.

The transparency of a polymer film can be changed by the following: reaction of the film with water; reaction of the film with oxygen; or crystallization of the polymer, meaning increased alignment of polymer molecules in the film.

As an example, a substrate could be chosen that is changed by components in air such as oxygen or water. For example, oxygen could oxidize the substrate, causing a change in its transparency or its index of refraction. Alternatively, the substrate could be designed to absorb water in the air, causing it to swell and change its optical properties. Another example is that the substrate could change its permeability to oxygen over time, thereby permitting the oxidation of the metallic layer. In the later case, the overall time sensitivity of the optical media could be a function of the properties of both the substrate and/or lacquer and the reflective layer.

The substrate or the metallic layer could also be made sensitive to specific wavelengths of light. Exposure to these wavelengths would cause a change in the optical qualities of the layer, thereby degrading the signal reaching the reader. Examples include photodepolymerization of the substrate; photogeneration of acid; photogeneration of singlet oxygen; and unzipping of the polymers (e.g., fissure of cross linking hydrogen bonds). Incorporation of light-activated catalysts into the substrate or the metallic layer can assist in this process.

Preferably, the data quality of the disk remains high for the intended period of use and then decays rapidly. One method of accomplishing this is to print a layer of metallic silver on the back of the disk, over the lacquer. Upon exposure to air the silver serves as a cathode, on which $O_2$ is reduced; aluminum serves as an anode. Corrosion is fast only if a short develops between the silver and the aluminum layers. The development of the short results from the growth of a silver dendrite through the lacquer.

To grow the dendrite through the lacquer it is desirable to use a lacquer that has some ionic conductivity. Typically the lacquer is a polyacrylate. If the polyacrylate is slightly hydrolyzed, or if it is, for example, a 2-hydroxyethylacrylate copolymer, there will be some ionic conductivity. Preferred are co-polymers of poly(acrylonitrile), or of poly(4-vinylpyridine), or of poly(1-vinylimidazole). All of these should conduct silver, copper or thallium ions ($Ag^+$ $Cu^+$ or $Tl^+$). Thallium is less preferred due to its toxicity.

The chemical equations are as follows:
Silver is air-oxidized:

$$4Ag + O_2 \rightarrow Ag_2O \text{ (complexed with lacquer)}$$

$$Ag_2O + H_2O + \text{complexant} \rightarrow 2Ag^+(\text{complexed}) + 2OH^-$$

$Ag^+$ is reduced by aluminum, which is oxidized (if $Ag^+$ is mobile in the lacquer, which is designed to conduct $Ag^+$)

$$Ag^+ + Al \rightarrow Al^{3+} + 3Ag^0$$

$$Al^{3+} + 3OH^- \rightarrow Al(OH)_3 \rightarrow Al(O)OH + H_2O$$

A silver dendrite starts growing from the aluminum to the silver. When the two layers are shorted, the "switch" between a battery's (Al) anode and (Ag) cathode is closed. Corrosion is rapid and catastrophic. One skilled in the art will recognize that other similar metals may be substituted for Al and Ag in this example.

Given a suitable substrate, the aluminum and silver coatings could be sputter deposited. The lacquer could be spin coated.

Another aspect of the invention is a composition comprising a degradable optical disk as described in this section packaged in an enclosure and atmosphere that protects it from the environmental stimulus that causes its failure. For example, the optical disk described above could be packaged in a metallized foil package containing a gas such as carbon dioxide, nitrogen or argon. The pressure of gas(es) in the package can be sub-atmospheric, preferably less than 1 torr. Inert gases such as argon are preferred. This would serve to protect the optical disk from oxygen, water, and/or light of certain wavelengths.

Another aspect of the invention is a method of manufacturing the degradable optical disk described above. The method involves coating the substrate or lacquer described above onto the metallic layer so that it partially or completely covers the disk, so that the optical signal from the disk degrades when exposed to a preselected environmental stimulus.

Another aspect of the invention is a method of manufacturing the degradable optical disk with a process that changes the optical properties of the substrate and/or the reflective properties of the metal layer in a way that can be partially or fully reversed, resulting in a fully or partially reversible loss of the ability to read the data on the optical disk.

Subsequently the disk can be exposed to a "reversing environment" that partially or fully reverses the impact of the previous step. The disk is subsequently packaged in a "preserving environment" (which may be identical to or different from the reversing environment). Opening the package results in a loss of the "preserving environment" and/or exposure to ambient conditions of oxygen, moisture and/or light, which will result in renewed degradation or loss of the ability to read data from the disk within a certain time period. It is preferable that this last degradation of the disk be difficult or impractical to reverse. For example, certain salts could be mixed with the polycarbonate pellets used in injection molding of the substrate. During the process of injection molding, these salts may interact with oxygen, carbon dioxide and/or water to form opaque compounds that modify the optical properties of the substrate. After the steps in the traditional manufacturing process, the optical disks could be chemically reduced in a hydrogen atmosphere, once again rendering the polycarbonate substrate transparent to the reading laser. Subsequently the disks could be packaged in a hydrogen environment. Opening the package would result in the loss of the reducing hydrogen and exposure to atmospheric oxygen, moisture and carbon dioxide, rendering the polycarbonate substrate opaque after a controlled time period.

Another aspect of the invention is a mechanical device which sets in motion a timed destruction of the data when the optical disk is removed from the packaging. In one embodiment, removing the disk from the packaging might break a seal exposing either the data side or the label side of a single-sided disk to reactants contained within either the disk itself or the packaging materials, thus triggering the process that renders the disk unusable after a certain period of time or a certain number of viewings. For example, a reducing gas could be stored in a compartment of the package apart from the disk. The disk comprises a protective layer that prevents oxidation of the underlying substrate or metal. The package is designed such that when the package is opened for the first time a seal is broken and the reducing gas contacts a surface of the disk, thereby causing the protective layer to be destroyed. The substrate or metal layer that had been protected from oxidation by the protective layer would then be susceptible to oxidation by air, as described above.

Alternatively, a timed destruction of the data can be triggered by electric current or charge provided by a small battery, or simply the energy released when the disk is removed from the package. For example, a reversible chromophore could be used. The chromophore is reduced to a colorless state when the potential is applied. When the potential is removed, the chromophore is gradually regenerated by oxidation by oxygen in air. In the regenerated state the chromophore absorbs light.

Alternatively, a charge storing device such as a small battery built into the packaging material, could provide an electric field that inhibits the reaction that destroys the disk's ability to read data. The process of removing the optical disk from its packaging would then interrupt the inhibiting field, thus triggering the process that destroys the disk's ability to read data. For example, the battery applies a potential to the metal layer which maintains the metal layer in a reduced state. When the potential is removed the metal layer begins to oxidize when contacted with an oxidizer such as oxygen in the air.

Another aspect of the invention is a method of manufacturing the degradable optical disk and packaging it in an enclosure and/or atmosphere that protects it from the environmental stimulus that causes its failure. The invention further comprises controlling the exposure of the finished optical disk to the environmental stimulus that causes its failure during the manufacturing and/or the packaging operations. For example, optical disks manufactured today may sit unpackaged for a substantial amount of time before being packaged. Such a time lag may act to significantly degrade the signal quality of the optical disks of this invention before the disks are even packaged. Therefore, the optical disk should be packaged in the protective enclosure and/or atmosphere within 24 hours of its production, preferably within 8 hours of its production, more preferably within one hour of its production and most preferably within 30 minutes of its production. Stated a different way, the optical disk should be packaged in its protective enclosure and/or atmosphere in a time period of less than 20% and preferably less than 10% of its expected degradation time.

It is also possible to manufacture and/or store the unpackaged optical disk in an environment that does not cause its degradation. Such an environment might be, for example, a nitrogen atmosphere, substantially zero air, or controlled lighting. Such an approach may be less desirable than promptly packaging the disk in a protective enclosure and/or atmosphere due to the high costs associated with these special environments.

Another aspect of the invention is a method of use of the optical disk described above, comprising packaging the disk in an enclosure and/or atmosphere that protects it from the environmental stimulus that causes its failure, then opening the package and exposing it to the environmental stimulus that causes its failure.

It is desirable to have the level of degradation be minimal for some initial period, and then speed up resulting in a rapid degradation of the ability to read data off the optical disk. One method of accomplishing this is the growth of dendrites through the lacquer, as described above. Another means for accomplishing this is to include a finite, controlled quantity of antioxidant along with a substance that reacts with oxygen. The anti-oxidant would protect the data from oxidation reactions until such time as the anti-oxidant was consumed, at which time the disk would rapidly degrade. For example, an organometallic compound that reacts with oxygen can be packaged with the disk to protect the disk from oxidation while in the package. Alternatively, the organometallic compound can be incorporated into the substrate, thus continuing to protect the metal layer for a period of time after the package has been opened.

The term coupled, as used herein, is defined as connected, although not necessarily directly, and not necessarily mechanically. The term substantially, as used herein, is defined as approximately (e.g., preferably within 10% of, more preferably within 1% of, most preferably within 0.1% of).

The particular material used for the substrates can be any substantially transparent material. Polymeric materials are preferred, such as, for example, polycarbonate, acrylic (polymethylmethacralate PMMA) or polyolefine. For the manufacturing operation, it is an advantage to employ a polycarbonate material.

However, the particular material selected for the substrate is not essential to the invention, as long as it provides the described function. Normally, those who make or use the invention will select the best commercially available material based upon the economics of cost and availability, the expected application requirements of the final product, and the demands of the overall manufacturing process.

While not being limited to any particular performance indicator or diagnostic identifier, preferred embodiments of the invention can be identified one at a time by testing for an accurate and precise time-sensitive decay of optical properties. More specifically, both the onset and duration of decay should be predictable. A sudden deterioration (brief duration of decay) is preferred, for example, approximately one hour. For instance, preferred embodiments of the invention can be identified one by one by testing for the presence of a narrow standard distribution of the time from activating event (e.g., exposure to air) to 50% optical deterioration (e.g., 50% loss of transmissivity or 50% loss of reflectivity). Many other optical (e.g., material property) tests are possible.

EXAMPLES

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

Example 1

Figure 1B:
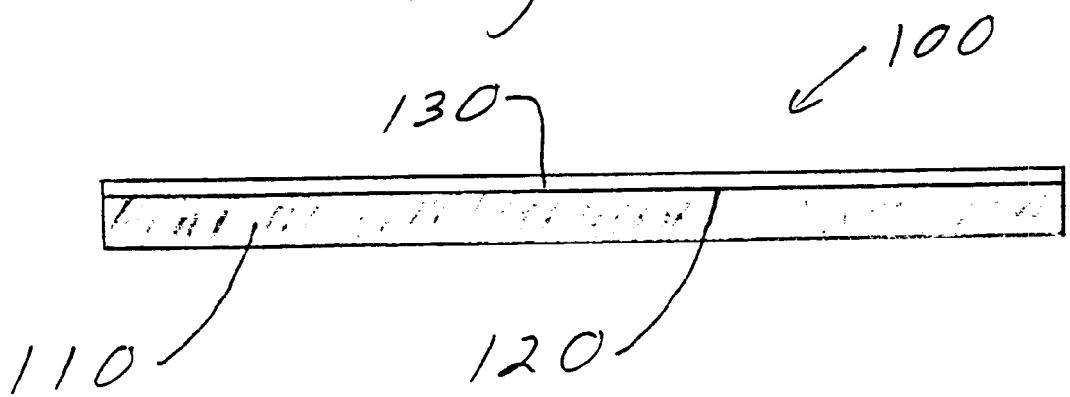

Referring to FIGS. 1a–1b, edge views of an optical disk 100 with a pseudo-transmissive read inhibitor are shown. The optical disk 100 includes a substrate 110, a reflective layer 120 and a lacquer layer 130. FIG. 1a shows the optical disk 100 in a first state wherein the substrate 110 is substantially optically transmissive. FIG. 1b shows the optical disk 100 in a second state wherein the substrate is substantially optically non-transmissive. The transformation from the first state to the second state is at-least-in-part a function of time from an initializing event, in this particular example, the opening of a substantially gas impermeable membrane (not shown) that encloses the optical disk 100 while it is packed, shipped and sold.

Example 2

Referring to FIGS. 2a–2b, edge views of an optical disk 200 with a pseudo-reflective read inhibitor are shown. The optical disk 200 includes a substrate 210, a data encoded component 220 and a lacquer layer 230. In this example, the data encoded component 220 is a thin film of metal. FIG. 1a shows the optical disk 200 in a first state wherein the data encoded component 220 is substantially optically reflective. FIG. 1b shows the optical disk 200 in a second state wherein the data encoded component 220 is substantially optically non-reflective. As in the first example, the transformation from the first state to the second state is at-least-in-part a function of time from an initializing event, in this second example, the opening of a substantially air tight laminated polymeric container (not shown) that encloses the optical disk 200 while it is packed, shipped and sold.

Practical Applications of the Invention

A practical application of the invention that has value within the technological arts is time-sensitive optical media. Further, the invention is useful in conjunction with DVD-ROM (such as are used for the purpose of software), or in conjunction with DVD-Audio (such as are used for the purpose of music), or in conjunction with DVD-video (such as are used for the purpose of movies), or the like. There are virtually innumerable uses for the invention, all of which need not be detailed here.

Advantages of the Invention

An optical media with time-sensitive properties, representing an embodiment of the invention, can be cost effective and advantageous for at least the following reasons. The invention allows a low cost retail product. The invention yields a product having the potential of a limited content lifetime. The invention permits the avoidance of rental returns. The invention and minimum changes to existing manufacturing precesses.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the optical media described herein can be a physically separate module, it will be manifest that the optical media may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

What is claimed is:

1. An optical media comprising:
   a substrate layer, wherein at least a fraction of said substrate layer transforms from a substantially protective state to a substantially non-protective state at-least-in-part as a function of time from a first initializing event; and
   a data encoded metal layer coupled to said substrate layer, wherein at least a fraction of said data encoded metal layer transforms from a substantially optically reflective state to a substantially optically non-reflective state at-least-in-part as a function of time from a second initializing event, wherein said second initializing event is controlled, at-least-in-part, by said substrate layer transforming from a substantially protective state to a substantially non-protective state.

2. The optical media according to claim 1 wherein said first initializing event and said second initializing event are the same.

3. The optical media according to claim 1 wherein said first initializing event and said second initializing event are different.

4. The optical media according to claim 1 wherein said at least a fraction of said substrate layer transforms after said first initializing event as a result of exposure to at least one of the group consisting of oxygen, water, hydrogen sulfide, light, air, a change in applied voltage, and an exposure to a mechanical stress.

5. The optical media according to claim 1 wherein said at least a fraction of said data encoded metal layer transforms after said second initializing event as a result of exposure to at least one of the group consisting of oxygen, water, hydrogen sulfide, light, air, a change in applied voltage, and an exposure to a mechanical stress.

6. The optical media according to claim 1 wherein said substrate layer further comprises an antioxidant.

7. The optical media according to claim 6 wherein said antioxidant is an organometallic.

8. The optical media according to claim 1 wherein said substrate layer transformation from a substantially protective state to a substantially non-protective state is localized to portions of the optical media that contain encoded data necessary to read the entire optical media.

9. The optical media according to claim 1 wherein said data encoded metal layer transformation from a substantially optically reflective state to a substantially optically non-reflective state is localized to portions of the optical media that contain encoded data necessary to read the entire optical media.

10. The optical media of claim 1 further comprising an enclosure enclosing the optical media, wherein said enclosure protects the optical media from said first initializing event.

11. The optical media of claim 10 wherein said enclosure further comprises at least one reactant regulating at least one of said first initializing event and said second initializing event.

12. The optical media of claim 11 wherein said at least one reactant is selected from the group consisting of an inert gas and a reducing gas.

13. The optical media of claim 10 wherein said first initializing event begins upon removal of said enclosure.

14. An optically-readable media comprising:
    a substrate;
    a reflective layer coupled to said substrate, wherein at least a fraction of said reflective layer changes at least one reflective property in part as a function of time in response to a first predefined stimulus;

wherein said substrate comprises:

one or more layers through which laser light of an optically-readable media reading device passes before impinging on the reflective layer;

a reactive agent that changes at least one optical property or physical property in response to a second predefined stimulus, wherein said change in at least one optical property or physical property in response to said second predefined stimulus interferes with the passage of light; and an antioxidant agent.

15. The optically-readable media according to claim 14, wherein said first predefined stimulus occurs before said second predefined stimulus.

16. The optically-readable media according to claim 14, wherein said first predefined stimulus occurs after said second predefined stimulus.

17. The optically-readable media according to claim 14, wherein said first predefined stimulus occurs at the same time as said second predefined stimulus.

18. The optically-readable media according to claim 14 wherein said first predefined stimulus and said second predefined stimulus are the same.

19. The optically-readable media according to claim 14 wherein said first predefined stimulus and said second predefined stimulus are not the same.

20. The optically-readable media according to claim 14 wherein said at least a fraction of said substrate changes as a result of exposure to at least one of the group consisting of oxygen, water, hydrogen sulfide, light, air, a change in applied voltage, and an exposure to a mechanical stress.

21. The optically-readable media according to claim 14 wherein said at least a fraction of said reflective layer changes at least one reflective property as a result of exposure to at least one of the group consisting of oxygen, water, hydrogen sulfide, light, air, a change in applied voltage, and an exposure to a mechanical stress.

22. The optically-readable media according to claim 14 wherein said antioxidant agent is an organometallic compound.

23. The optically-readable media according to claim 14 wherein said change in at least one reflective property of said reflective layer is localized to portions of the optically-readable media that store information necessary to read the optically-readable media.

24. The optically-readable media of claim 14 further comprising an enclosure enclosing the optically-readable media, wherein said enclosure includes semi-permeable material and provides a controlled environment for said optically-readable media.

25. The optically-readable media of claim 24 wherein said enclosure further comprises at least one reactant regulating at least one of said first predefined stimulus and said second predefined stimulus.

26. The optically-readable media of claim 25 wherein said at least one reactant is selected from the group consisting of an inert gas and a reducing gas.

27. The optically readable media of claim 24 wherein the rate at which said reflective layer reacts with said first predefined stimulus and the rate at which said reactive agent of said substrate reacts with said second predefined stimulus accelerates upon removal of said enclosure.

28. The optically-readable media according to any one of claims 18, 19, 15, 16, and 17, wherein said change in at least one optical property or physical property of said substrate and said change in at least one reflective property of said reflective layer occur at different rates.

29. The optically-readable media according to claim 14, wherein said first predefined stimulus and said second predefined stimulus are selected from the group comprising oxygen and water.

30. The optically-readable media according to claim 14, wherein varying the amount of the antioxidant agent in at least one of the layers of said substrate determines the timing at which said reflective layer changes in at least one reflective property in response to said first predetermined stimulus and the rate at which said at least on optical property or physical property changes in at least one layer of said substrate in response to said second predefined stimulus.

31. The optically-readable media according to claim 14 further comprising a lacquer layer coupled to said reflective layer and a second reflective layer coupled to said lacquer layer, wherein said second reflective layer coupled to said lacquer layer coupled to said first reflective layer forms a galvanic cell.

32. The optically-readable media according to any one of claims 14 and 31, wherein said change of at least one optical property or physical property in at least one layer of said substrate prohibits access to information stored on the optically-readable media and said change in at least on reflective property of said reflective layer destroys the information stored on the optically-readable media.

33. The optically-readable media according to claim 24, wherein at least a part of the package is semi-permeable to at least one of select atmospheric gases or water vapor.

34. An optical media comprising:

a data encoded metal layer, wherein at least a fraction of said data encoded metal layer transforms from a substantially optically reflective state to a substantially optically non-reflective state at-least-in-part as a function of time from an initializing event; and at least one non-metallic reactant compounded within said data encoded metal layer.

35. The optical media according to claim 34 wherein said at least one non-metallic reactant is a light activated catalyst.

36. The optical media according to claim 34 wherein said at least a fraction of said data encoded metal layer transforms as a result of exposure to at least one of the group consisting of oxygen, water, hydrogen sulfide, light, air, a change in applied voltage, and an exposure to a mechanical stress.

37. The optical media according to claim 34 wherein said data encoded metal layer transformation from a substantially optically reflective state to a substantially optically non-reflective state is localized to portions of the optical media that contain encoded data necessary to read the remainder of the optical media.

38. The optical media of claim 34 further comprising an enclosure enclosing the optical media, wherein said enclosure protects the optical media from said first initializing event.

39. The optical media of claim 38 wherein said enclosure further comprises at least one reactant regulating at least one of said first initializing event and said second initializing event.

40. The optical media of claim 39 wherein said at least one reactant is selected from the group consisting of an inert gas and a reducing gas.

41. The optical media of claim 38 wherein said initializing event begins upon removal of said enclosure.

42. An optical media comprising:

a substrate;

a data encoded first metal layer coupled to said substrate layer, wherein at least a fraction of said data encoded metal layer transforms from a substantially optically reflective state to a substantially optically non-reflective state at-least-in-part as a function of time from an initializing event;

a lacquer layer coupled to said data encoded metal layer, wherein said lacquer layer includes at least one selected from the group consisting of poly(acrylonitrile), poly(4-vinylpyridine), poly(1-vinylimidazole), hydrolyzed polyacrylate lacquer, and 2-hydroxyethylacrylate; and a second metal layer coupled to said lacquer layer.

43. The optical media of claim 42 further comprising an enclosure enclosing the optical media, wherein said enclosure protects the optical media from said initializing event.

44. The optical media of claim 43 wherein said enclosure further comprises at least one reactant regulating said initializing event.

45. The optical media of claim 44 wherein said at least one reactant is selected from the group consisting of an inert gas and a reducing gas.

46. The optical media of claim 43 wherein said initializing event begins upon removal of said enclosure.

* * * * *